US007430018B1

(12) United States Patent
Patel

(10) Patent No.: US 7,430,018 B1
(45) Date of Patent: Sep. 30, 2008

(54) TIMESHARING OF A DISPLAY SCREEN

(75) Inventor: Neelakant Reddy Patel, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/054,145

(22) Filed: Mar. 24, 2008

(51) Int. Cl.
*H04N 9/47* (2006.01)
*H04N 15/00* (2006.01)
*H04N 13/00* (2006.01)
*H04N 5/45* (2006.01)
*H04N 9/74* (2006.01)
*G09G 5/00* (2006.01)

(52) U.S. Cl. .................. 348/588; 348/42; 348/54; 348/564; 348/565; 345/1.3

(58) Field of Classification Search .......... 348/42, 348/54, 564, 565, 588; 345/1.3
See application file for complete search history.

(56) References Cited

U.S. PATENT DOCUMENTS

| 4,562,463 | A | * | 12/1985 | Lipton ..................... 348/56 |
| 4,683,497 | A | | 7/1987 | Mehrgardt |
| 4,888,641 | A | | 12/1989 | Isnardi et al. |
| 5,233,338 | A | | 8/1993 | Surguy |
| 5,614,920 | A | * | 3/1997 | Coteus et al. ............... 345/7 |
| 5,629,984 | A | * | 5/1997 | McManis .................. 380/54 |
| 5,821,989 | A | * | 10/1998 | Lazzaro et al. ............. 348/56 |
| 5,963,371 | A | * | 10/1999 | Needham et al. ........... 359/464 |
| 6,111,596 | A | * | 8/2000 | Haskell et al. ............. 348/42 |
| 6,188,442 | B1 | | 2/2001 | Narayanaswami |
| 6,268,887 | B1 | * | 7/2001 | Watanabe et al. ........... 348/554 |
| 6,433,832 | B2 | * | 8/2002 | Watanabe et al. ........... 348/554 |
| 6,529,209 | B1 | * | 3/2003 | Dunn et al. ................ 345/629 |
| 6,924,833 | B1 | * | 8/2005 | McDowall et al. .......... 348/42 |
| 6,924,846 | B2 | * | 8/2005 | Ohba et al. ................ 348/584 |
| 6,980,177 | B2 | * | 12/2005 | Struyk ...................... 345/8 |
| 7,034,776 | B1 | * | 4/2006 | Love ........................ 345/2.1 |
| 7,123,213 | B2 | * | 10/2006 | Yamazaki et al. ............ 345/7 |
| 7,191,338 | B2 | * | 3/2007 | Stern et al. ................. 713/183 |
| 7,369,100 | B2 | * | 5/2008 | Zacks et al. ................ 345/1.3 |
| 2003/0133569 | A1 | * | 7/2003 | Stern et al. ................. 380/206 |
| 2004/0056948 | A1 | | 3/2004 | Gibson |

FOREIGN PATENT DOCUMENTS

| EP | 0913995 A1 | 5/1999 |
| EP | 1739976 | * 1/2007 |

* cited by examiner

*Primary Examiner*—Brian P Yenke
(74) *Attorney, Agent, or Firm*—MaxvalueIP, LLC

(57) ABSTRACT

Since a continuous movie effect is created at 24 frames/second, a TV or a movie screen capable of displaying 48 frames/second can alternate the frames from two different programs, so that the frames of each program will have the rate of 24 frames/second. Two viewers wearing eye-pieces with phase locking strobe, running at 24 frames/second, can each lock on different set of alternating frames, and block the other set. The strobe is synchronized with the display, so that each of the viewers gets to see only the 24 frames/sec that is relevant to the program that viewer is watching. One embodiment allows other viewer to view another program at 24 frames/second. Each viewer also has a separate audio feed associated with his or her viewing program.

1 Claim, 4 Drawing Sheets

TIMESHARING OF A DISPLAY SCREEN

BACKGROUND OF THE INVENTION

Multiple people viewing a single TV (television) set may not be able to watch his/her choice of program. Similarly, a movie theater can not show different movies concurrently at the same location. There is not an easy way for each person in a group to watch a program from a given set without interfering with what another person is viewing. An embodiment of invention solved this problem, as an example of its application.

SUMMARY OF THE INVENTION

Since a continuous movie effect is created at 24 frames/second, a TV or a movie screen capable of displaying 48 frames/second can alternate the frames from two different programs so that the frames of each program will have the rate of 24 frames/second. Two viewers wearing eye-pieces with phase locking strobe running at 24 frames/second can each lock on different set of alternating frames and block the other set. The strobe is synchronized with the display, so that each of the viewers gets to see only the 24 frames/sec that is relevant to the program that viewer is watching. The other viewer can, therefore, view another program 24 frames/second. Each viewer also has a separate audio feed associated with his or her viewing program.

An embodiment of the invention is not limited to TV sets. An embodiment of the invention applies to movie theaters or any projection system, as well as any type of display sharing application or device.

DETAILED DESCRIPTION OF THE PREFERRED EMBODIMENTS

For demonstration, and not by any way of limitation, the case of TV set is used here to describe an embodiment of the invention.

In one embodiment, we describe the invention based on two viewers A and B watching ProgA (Program A) and ProgB (Program B). However, the invention can be extended to any number of viewers.

In an embodiment of the invention, the TV set boosts the display rate from 24 frames per sec to 48 frames per sec (or any multiple of 24 frames/sec, for which the system is showing concurrent programs). The frames form ProgA and ProgB are displayed alternatively.

One embodiment of the invention provides each of the viewers A and B an eye piece equipped strobes to filter only the frames meant for the specific viewer to watch. Therefore, A's eye piece filters only the frames from ProgA, while B's eye piece filters only the frames from ProgB. In this way, each program appears to the viewer at a normal rate of 24 frames. If more people want to participate in the viewing session, the TV set will boost the display frame rate accordingly, so that each viewer's eye piece are programmed to filter in only the relevant frames.

The audio feed for each viewer is programmed to pick up the audio transmission from the system (wirelessly or with wire) for only the audio stream associated with the program being viewed by that viewer.

One embodiment of the invention enables timesharing the display screen and gives each viewer only the frames and audio relevant to the viewer's program. The invention also applies to movie theatre with multiple viewers, or video conferencing session, where time sharing of the screen or visual media is desired.

Figure 1:
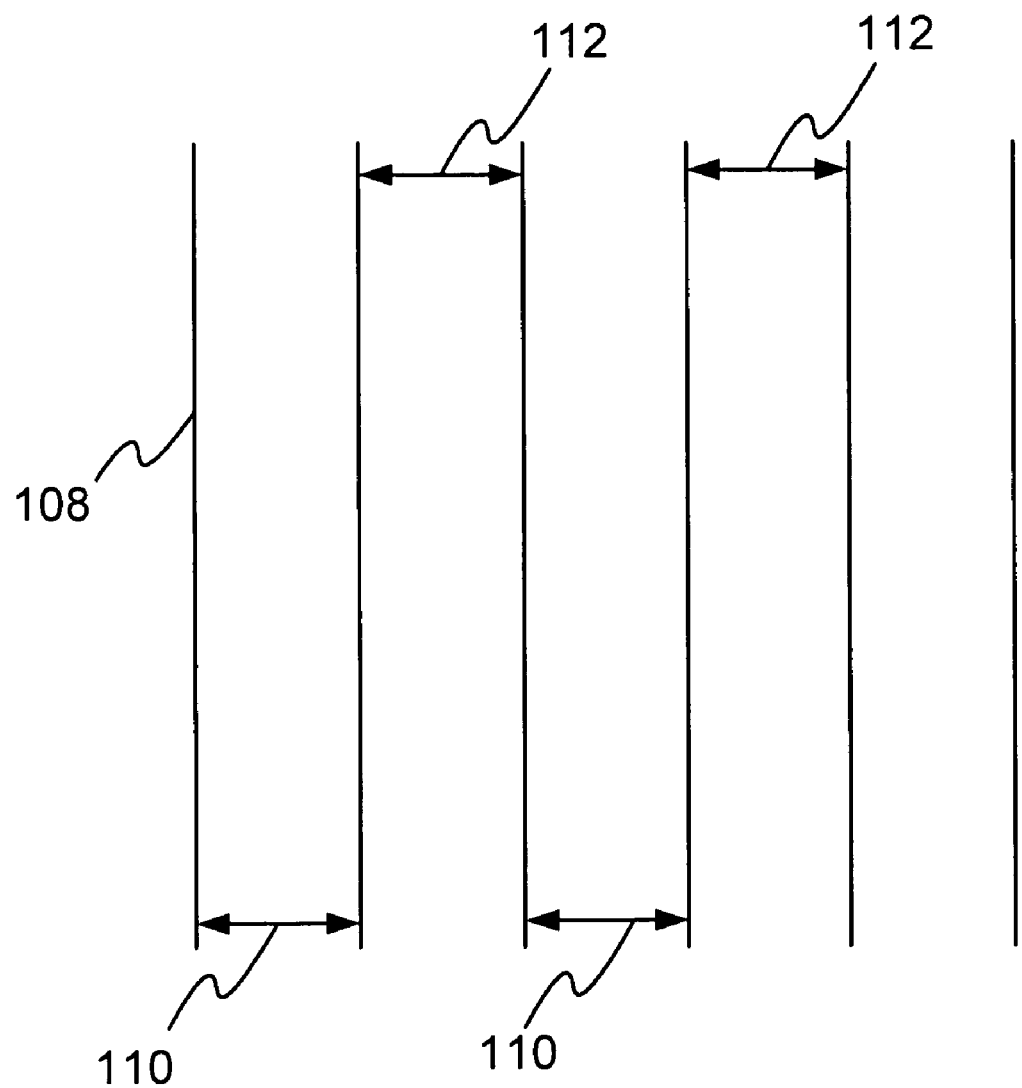
FIG. 1 is a schematic diagram of the basic concept of TV viewing.

Referring more particularly to the drawings, FIG. 1 is a schematic diagram of the basic concept of TV viewing. It takes about $\frac{1}{24}$ second for our eyes to register an image (110). In TV viewing, a series of still images (108) separated by about $\frac{1}{24}$ second are displayed to form a moving effect. During the intervening period between the frames (110), the TV screen is blank (112); however, our eyes are not sensitive enough to notice it.

Figure 2:
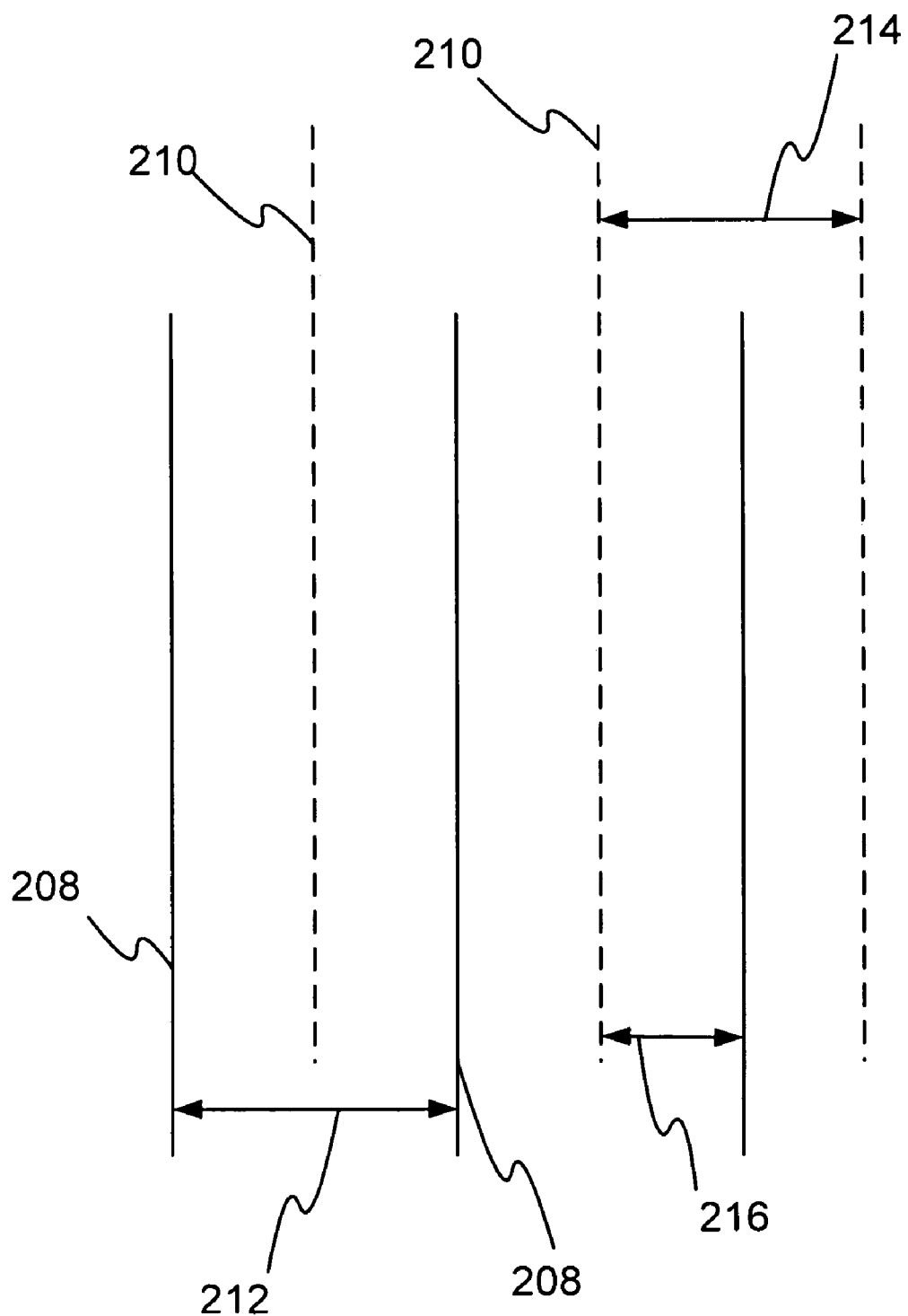
FIG. 2 is a schematic diagram of the two viewers watching program A and program B.

FIG. 2 is a schematic diagram of the two viewers watching program A and program B. In one embodiment, we have two viewers A and B watching progA (208) and progB (210), respectively. The frames from progA (208) and progB (210) can be multiplexed alternatively (212) and (214), such that the same program is shown at the interval of $\frac{1}{24}$ second. The frame rate for each of the programs is one frame per $\frac{1}{24}$ second, and the frame of the progB (210) appears $\frac{1}{48}$ second (216), after the latest progA (208) frame appeared.

In an embodiment of the invention, viewers are viewing every $\frac{1}{24}^{th}$ of a second, and the viewer B should bring the slot in the line of sight $\frac{1}{48}$ second after the viewer A. The timings of two viewers are synchronized independently from each other, but they are based on the synching signal from the system according to the program they are set to view. Therefore, when viewer A is aligned with the display, the viewer B is completely blocking the view and vise versa.

Figure 3:
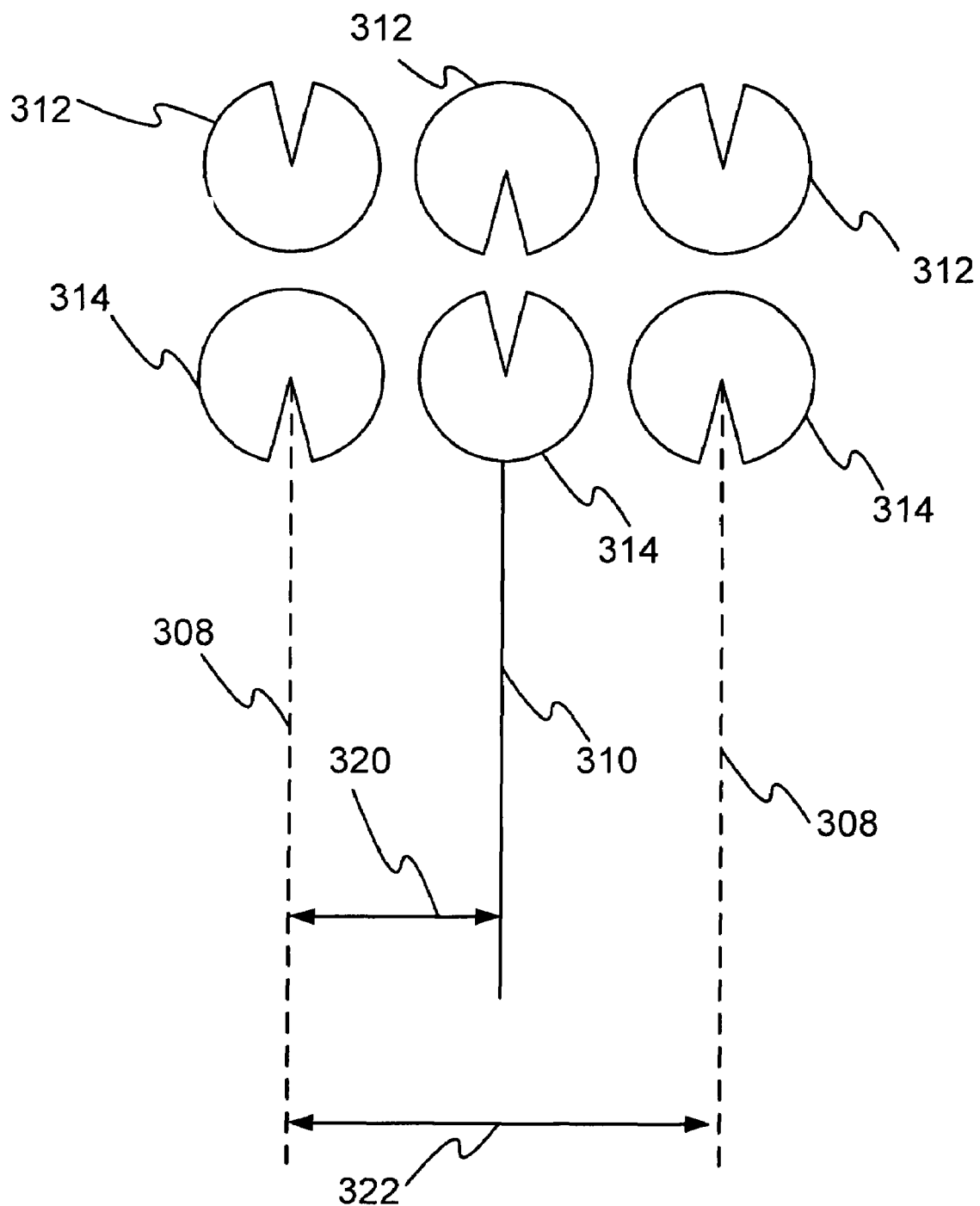
FIG. 3 is a schematic diagram of the strobe disk positions for viewer A and viewer B.
Figure 4:
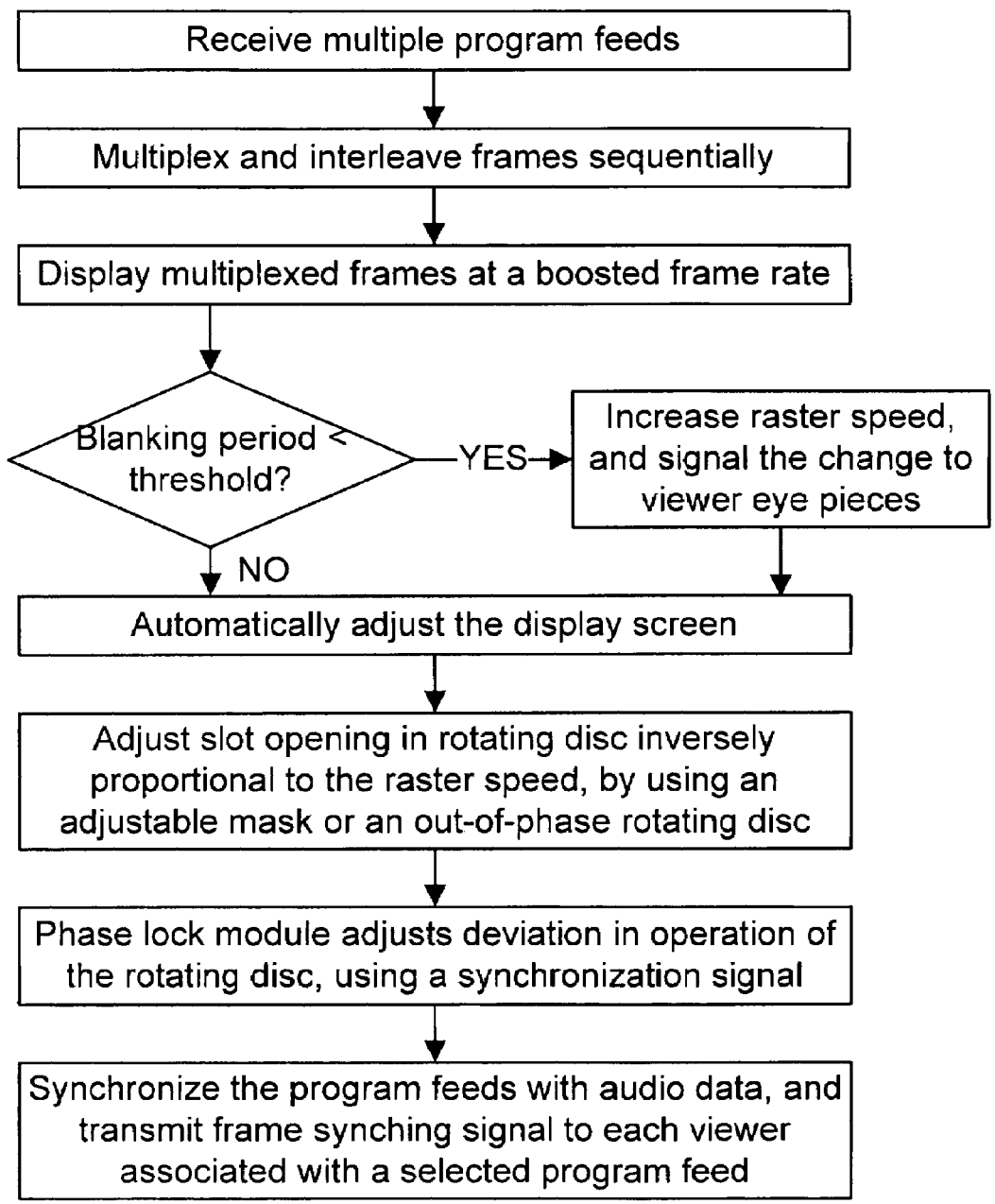
FIG. 4 is a flow chart depicting an embodiment of the invention.

FIG. 3 is a schematic diagram of the strobe disk positions for viewer A and viewer B. In one embodiment, the positions for Viewer A (314) and Viewer B (312) at 0 second and thereafter are shown, with both viewers (312 and 314) completing one rotation at $\frac{1}{24}$ second (322).

This figure shows how the Viewer A (314) is always in sync with the frames of progA (308), and the viewer B (312) is always in sync with the frames of progB (310). Both viewers are viewing every $\frac{1}{24}^{th}$ of a second, but they start with different phase angles.

After multiplexing and alternating the frames from multiple programs, the system displays those frames in sequence at a higher rate to maintain the frame rate for a given set of frames associated with the same program. In case of two programs, the system boosts the frame rate to 48 frames per second (320). However, if there are 3 programs, the frame rate of our TV should be boosted to 72 frames per second (integer multiple of 24 frames per second), and so on.

To decide at what phase angle each of the viewers would start, the synching signal is communicated between the system and the viewer, so that the phase angle will automatically get adjusted, depending on the program selected by the viewer. The phase locking also helps avoid the phases of the frame sequence being displayed and the strobe drift apart. As such, the synching signal can be sent for every viewed frame or any multiple of that period (i.e. multiple of $\frac{1}{24}$ second) depending on the accuracy and consistency of the viewer's strobe speed.

In an embodiment of the invention, multiple viewers can still share viewing the same program by selecting the same program, by having the same synching signal directed to their viewers. Therefore, the driving parameter in boosting the system frame rate is the number of programs to be multiplexed, and not necessarily the number of viewers watching the display through the eye pieces. An embodiment of the invention can be applied to situations with large number of viewers and large number of programs shown concurrently.

For audio each of the viewers will have a separate audio feed that can be heard over a head phone. The audio feed can be transmitted either through a wire or wireless. The source of the feed is the audio track of the program selected by the viewer.

In an embodiment of the invention, the same idea can be applied in a movie theater, where in people can watch different movies of their choice (of course selected from a given set). If a projection system is used, the projector can project frames from different movies alternatively in a similar manner.

As the number of the programs to be interleaved increases, the blanking durations between the subsequent frames of different programs shortens to accommodate the multiplexing of additional program frames. After some minimum blanking duration is reached, it reduces the display duration of the individual frame, so to pack more frames from multiple programs in a ¹⁄₂₄ second interval. The system can automatically switch to a faster display raster speed, to provide for shorter frame display. The shorter display time can reduce the average brightness of the image displayed as perceived by human eye, the system can also automatically adjust the display setting to compensate (e.g., the system can automatically increase the brightness of the display).

In one embodiment of the invention, with the faster display raster speed, the opening in strobe disc slot can be reduced to avoid spilling the view duration to a next frame from another program. This can be achieved manually or automatically, by an adjustable view mask reducing the effective slot opening of the strobe, or using a second rotating strobe disc in the eye piece with the same or bigger slot opening (positioned and rotating on the same axis as the first disc, but phase-misaligned with the first strobe disc), so that when the viewer views the display through both discs' slots, a smaller overall opening is available. With smaller opening, the effective duration for viewing the display is reduced. For automatic operation, the system signals the viewer apparatus to reduce the effective slot opening, such that the effective slot opening is inversely proportional to the display raster speed. The program frame rate, as well as strobe frequencies, are still kept the same, at about 24 frames per seconds, to provide for smooth movie display of images. In one embodiment, the raster speeds are preconfigured to a set of values with corresponding preconfigured masking positions, or phase offsets, on the strobe discs at the viewer apparatus, corresponding to those preconfigured display raster speeds. In one embodiment, the strobe can include multiple slots, spaced uniformly, so that the rotational frequency of the strobe disc can remain a whole integer fraction of the frame rate of the viewed program.

In fact this concept can be applied wherever time-sharing of the screen is possible.

In one embodiment, it is a method for timesharing of a display screen in a multimedia display system, the method comprises:

the multimedia display system receiving multiple program feeds; wherein each of the multiple program feeds having same frame rates;

multiplexing frames from each of the multiple program feeds, by interleaving one frame from each of the multiple program feeds sequentially in the same repeating order;

displaying the multiplexed frames from each of the multiple program feeds at a boosted frame rate; wherein the boosted frame rate is equal to the number of interleaved program feeds times an original viewing frame rate;

setting a blanking period between each frame raster on the display screen;

defining a threshold blanking period;

if number of the multiple program feeds increases, such that the blanking period is shorter than the threshold blanking period, then increasing raster speed, to reduce frame display duration; wherein the raster speed is preconfigured to a set of raster speeds;

automatically adjusting an attribute of the display screen, to compensate for reduction of display brightness, due to any reduced display duration;

signaling viewer eye pieces about any changes in the raster speed; wherein one of multiple-viewer apparatuses for viewing the display screen comprising a viewing strobe, and a first rotating disc, with one or more slots, angularly uniformly distributed, with a slot opening in a user's line of sight;

adjusting the slot opening, using an adjustable mask, or using a second rotating disc; wherein the second rotating disc rotating at the same speed, but out-of-phase, with respect to the first rotating disc;

a phase lock module, with a feedback mechanism, adjusting any deviation in operation of the first rotating disc, using a synchronization signal; wherein the slot opening is adjusted inversely proportional to the raster speed;

synchronizing the multiple program feeds with audio data;

selecting one of the multiple program feeds to view;

transmitting a frame synching signal to each of the multiple-viewer apparatuses, which is associated with the selected one of the multiple program feeds to view; and wherein frequency of the frame synching signal is the same or a whole fraction of the original viewing frame rate.

A system, apparatus, or device comprising one of the following items is an example of the invention: time-shared devices, projector, TV, movie-theater, display, multiplexer, de-multiplexer, interleaving, server, client device, PDA, mobile device, cell phone, storage to store the messages, router, switches, network, communication media, cables, fiber optics, physical layer, buffer, nodes, packet switches, computer monitor, or any display device, applying the method mentioned above, for purpose of presentation, entertainment, movies, meetings, and information/sharing/display/management.

Any variations of the above teaching are also intended to be covered by this patent application.

The invention claimed is:

1. A method for timesharing of a display screen in a multimedia display system, said method comprising:

said multimedia display system receiving multiple program feeds;

wherein each of said multiple program feeds having same frame rates;

multiplexing frames from each of said multiple program feeds, by interleaving one frame from each of said multiple program feeds sequentially in the same repeating order;

displaying said multiplexed frames from each of said multiple program feeds at a boosted frame rate;

wherein said boosted frame rate is equal to the number of interleaved program feeds times an original viewing frame rate;

setting a blanking period between each frame raster on said display screen;

defining a threshold blanking period;

if number of said multiple program feeds increases such that said blanking period is shorter than said threshold blanking period, then increasing raster speed, to reduce frame display duration;

wherein said raster speed is preconfigured to a set of raster speeds;

automatically adjusting an attribute of said display screen, to compensate for reduction of display brightness, due to any reduced display duration;

signaling viewer eye pieces about any changes in said raster speed;

wherein one of multiple-viewer apparatuses for viewing said display screen comprising a viewing strobe, and a first rotating disc with one or more slots angularly uniformly distributed, with a slot opening in a user's line of sight;

adjusting said slot opening, using an adjustable mask, or using a second rotating disc;

wherein said second rotating disc rotating at the same speed, but out-of-phase, with respect to said first rotating disc;

a phase lock module, with a feedback mechanism, adjusting any deviation in operation of said first rotating disc, using a synchronization signal;

wherein said slot opening is adjusted inversely proportional to said raster speed;

synchronizing said multiple program feeds with audio data;

selecting one of said multiple program feeds to view;

transmitting a frame synching signal to each of said multiple-viewer apparatuses which is associated with said selected one of said multiple program feeds to view; and wherein frequency of said frame synching signal is the same or a whole fraction of said original viewing frame rate.

* * * * *